United States Patent
Srinivasan

[11] 3,842,364
[45] Oct. 15, 1974

[54] PHOTOCHEMICAL IODINE LASER

[75] Inventor: Rangaswamy Srinivasan, Ossining, N.Y.

[73] Assignee: International Business Machines Corporation, Armonk, N.Y.

[22] Filed: Feb. 23, 1973

[21] Appl. No.: 335,407

[52] U.S. Cl. ................................ 331/94.5, 330/4.3
[51] Int. Cl. ............................................ H01s 3/22
[58] Field of Search ..................... 331/94.5; 330/4.3

[56] References Cited
OTHER PUBLICATIONS

Giuliano et al., IEEE Journal of Quantum Electronics, vol. QE-6, no. 3, March 1970, p. 186. QC 447 17.

Primary Examiner—John K. Corbin
Assistant Examiner—R. J. Webster
Attorney, Agent, or Firm—George Baron

[57] ABSTRACT

The incorporation of a free radical source in an iodine laser for the purpose of removing iodine in its ground state as well as iodine molecules that serve as quenchers of excited iodine. The pumping light that excites the iodine laser also photolyses the free radical source to produce more free radicals at the same time that the excited iodine is produced.

1 Claim, 4 Drawing Figures

$CF_3I = 40$ TORR IN ALL EXAMPLES
HFAM PRESSURES AS INDICATED

FIG. 1
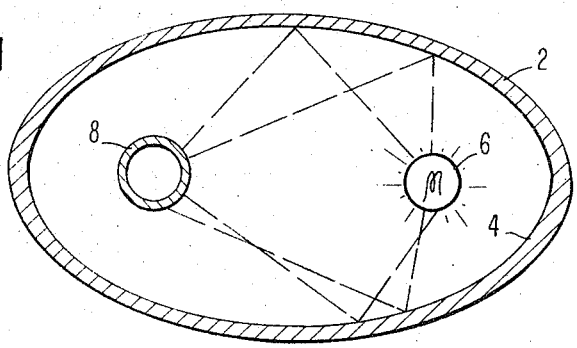
FIG. 2
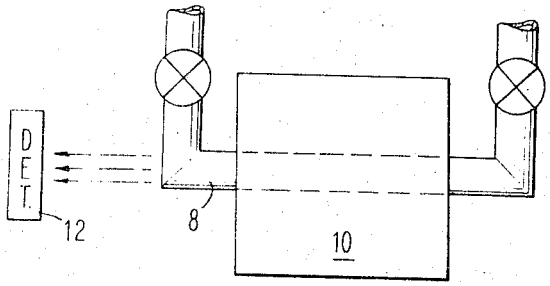
| TOTAL ENERGY IN MILLIJOULE AT 1.315 μ | | |
|---|---|---|
| $CF_3I$ | HFAM | mj |
| 40 | 0 | 265 |
| 40 | 10 | 360 |
| 40 | 20 | 460 |
| 40 | 30 | 385 |
FIG. 4
FIG. 3
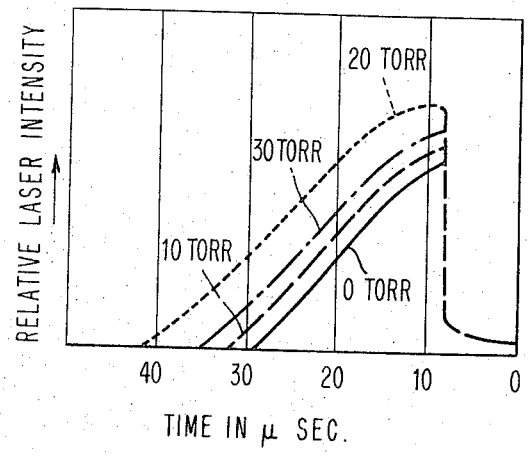
$CF_3I$ = 40 TORR IN ALL EXAMPLES
HFAM PRESSURES AS INDICATED

PHOTOCHEMICAL IODINE LASER

BACKGROUND OF THE INVENTION

The excited iodine atom $I_{1/2}$ (hereinafter referred to as I*) in a lasing cavity is produced normally by the reaction $CF_3I+h\nu' \rightarrow CF_3+I^*$. The reaction also produces iodine molecules, the latter being the quenchers of the excited iodine producing the lasing. This invention teaches the injection of a free radical (any species with an unpaired electron and which is polyatomic) from a secondary source into the lasing system to accomplish the following:

1. the free radicals serve to remove iodine in its ground state;
2. the free radicals remove iodine molecules, the latter being an important quencher of the lasing process;
3. the free radical source is also photolysed when the iodine laser is pumped so that more free radicals are produced.

Known iodine lasers have as their active ingredient, perfluoroalkyl iodides or alkyl iodides. The above desirable features not only increase the energy of the output pulse of the laser but also help to sustain the laser pulse for longer periods of time.

DESCRIPTION OF THE DRAWINGS

FIG. 1 is a schematic showing of an iodine laser.

FIG. 2 shows the manner in which the iodine and free radical source is introduced into the laser cavity.

FIG. 3 is a plot of relative light intensity of the laser versus time of duration of the pulse.

FIG. 4 is a table comparing relative intensity of laser as a function of pressure of the added free radical.

As seen in FIG. 1, the laser cavity comprises an elliptical body 2, whose inner surface 4 is highly reflective of light coming from a flashlamp 6 placed at one of the foci of such ellipse. At the other focus of the elliptical shaped body 2 is placed a transparent tube 8 which carries the iodine that is to lase as well as the free radical that will enhance lasing. As seen in FIG. 2, the elliptical body 2 is supported in a housing 10 and the transparent tube 8 allows for entrance and exit of the required materials into the laser cavity. It should be understood, that although a mirrorless cavity is shown, any other cavity, such as a Fabry-Perot cavity, could be substituted for that shown in FIG. 1 without departing from the spirit of this invention. A suitable detector 12, such as an indium antimonide detector, was connected to a Tektronix 555 oscilloscope to monitor the lasing output.

In prior art references to the photochemical iodine laser, the basic reactions that take place are

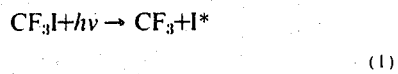

(1)

and

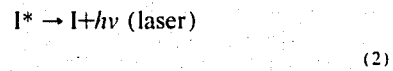

(2)

By introducing $CF_3I$ and Hexafluoroazomethane (HFAM), both of which were degassed at liquid nitrogen temperature before use, into tube 10 and then actuating flashlamp 6, a substantial increase in the intensity of the iodine laser was detected as compared with the intensity of the iodine laser without the addition of the free radical.

While almost any free radical is believed beneficial, sources of $CF_3$ radicals which can be added to the iodides in the laser before photolysis include $CF_3NNCF_3$, $CF_3COCF_3$ and $CF_3NO$. Methyl radicals are equally beneficial as additives and recommended $CH_3$ radical sources are azomethane, acetone and $CH_3NO$. In one instance, a sample of $CF_3I$, at a pressure of 40 Torr, was introduced into the laser cavity and flashlamp 6 emitted a 20$\mu$ sec. pulse width, resulting in a 1.3 micron laser pulse, due to the iodine atoms, having an energy of 265 millijoules. An addition of $CF_3NN_2CF_3$ at a pressure of 10 Torr into the tube 8 increased the laser output, when pumped by flashlamp 6, to 360 millijoules and when $CN_3NN_2CF_3$ was introduced into the laser cavity at a pressure of 20 Torr, the laser output was 460 millijoules.

Table 1 (FIG. 4) summarizes the results of lasing when $CF_3I$ is maintained at 40 Torr whereas the pressure of additive HFAM is changed from 0 to 30 Torr. Table I indicates that the total energy emitted by the iodine laser reaches a maximum at about 20 Torr of HFAM and diminishes thereafter with increasing pressure. It is believed that maximum decomposition of the HFAM occurs at about 20 Torr, accounting for such maximum energy output. As seen in FIG. 3, the duration of the pulse increases with the additive HFAM.

While the theoretical explanation that follows is not to be relied upon as being wholly descriptive of why the invention causes the improved lasing characteristics observed, it is believed to be a reasonable explanation of the observed facts. Equations (1) and (2) noted hereinabove apply to the basic iodine laser using no additives. When an additive, such as $CF_3NNCF_3$ is used, then

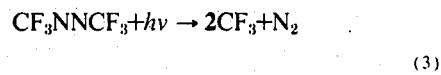

(3)

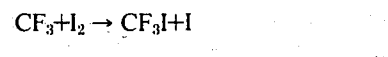

(4)

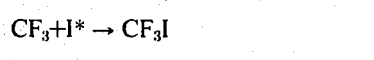

(5)

(6)

Reaction (4) removes molecular iodine from the system and thus scavenges a powerful quencher of I*. This asset is somewhat offset by the introduction of one atom of I which would deter the build-up of a population inversion. However, this is a relatively slow process and would be of importance towards the end of the pumping flash.

Equation (5) is a desirable reaction in that it serves to sustain the population inversion and increase the duration of the lasing pulse as well as the presence of $CF_3$ radicals.

Another mode of action of HFAM is as a trap for $CF_3$ radicals derived from itself as well as from $CF_3I$ as is seen in the reactions

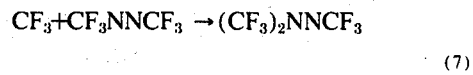

(7)

and $$CF_3 + (CF_3)_2NNCF_3 \rightarrow (CF_3)_2NN(CF_3)_2 . \quad (8)$$

Since the absorption of HFAM is weaker than that of $CF_3I$, it is expected that at high $CF_3I$ pressure the photodissociation of HFAM will be efficient and its effect will be predominantly as a trap for $CF_3\cdot$ radicals. Under these conditions, the output of the laser is diminished and the effect persists over the entire duration of the lasing pulse.

For low $CF_3I$ concentration, the addition of HFAM (4 parts $CF_3I$ to 1 part HFAM) augments the laser output by about 40 percent and the effect increases with increasing HFAM pressure. This is attributable to the complete decomposition of HFAM, leading to an increase in the concentration of $CF_3$ radicals. At a ratio of $CF_3I$:HFAM of 4:3, the output of the laser starts to drop off (although it is still greater than for pure $CF_3I$ at an identical pressure), because the HFAM is not totally dissociated and the undecomposed material offsets the beneficial effect of $CF_3$. It is therefore essential to optimize the pressure of HFAM to the reaction conditions.

What is claimed is:

1. A photochemical laser including an active material in a lasing cavity and optical pumping means for exciting said active material, the improvement comprising the use of perfluoromethyl iodide as the active medium and an additive of hexafluoroazomethane to said active material so that both said active material and said additive are photolyzed simultaneously by the operation of said optical pump.

* * * * *